United States Patent [19]

Colter

[11] Patent Number: 5,662,432

[45] Date of Patent: Sep. 2, 1997

[54] PIPE INSERTION MACHINE AND METHOD

[75] Inventor: H. Scott Colter, Austin, Tex.

[73] Assignee: Cook Construction Company, Inc., Albuquerque, N. Mex.

[21] Appl. No.: 411,571

[22] Filed: Mar. 27, 1995

[51] Int. Cl.⁶ .............................. E02F 5/10; E03F 3/06; F16L 1/00
[52] U.S. Cl. ............................................ 405/184; 405/154
[58] Field of Search ................................... 405/184, 154

[56] References Cited

U.S. PATENT DOCUMENTS

| | | | |
|---|---|---|---|
| 4,507,019 | 3/1985 | Thompson | 405/184 X |
| 4,647,256 | 3/1987 | Hahn et al. | 405/184 |
| 4,668,125 | 5/1987 | Long, Jr. | 405/154 |
| 4,724,108 | 2/1988 | Jurgenlohmann et al. | 264/35 |
| 4,808,032 | 2/1989 | John | 405/184 |
| 4,930,542 | 6/1990 | Winkle et al. | 138/98 |
| 5,145,282 | 9/1992 | Payne | 405/155 |
| 5,316,652 | 5/1994 | Smith | 405/184 X |

FOREIGN PATENT DOCUMENTS

| | | | |
|---|---|---|---|
| 943471 | 7/1982 | U.S.S.R. | 405/184 |
| 90/15197 | 12/1990 | WIPO | 405/184 |

OTHER PUBLICATIONS

1980's Pipe Insertion Machine (Plus 7 photographs).

1970's Pipe Insertion Machine.

Primary Examiner—Tamara L. Graysay
Assistant Examiner—Tara L. Mayo
Attorney, Agent, or Firm—Christensen O'Connor Johnson & Kindness PLLC

[57] ABSTRACT

A pipe insertion machine for pushing new pipe sections (82) into an existing pipeline (22) having a internal diameter is provided, including a support structure (39), translating components (80), and gear reduction components (120). The support structure (39) includes a plurality of support beams rigidly connected to form a frame and a longitudinal axis parallel to the existing pipeline (22). The translating components (80) include a winch drum (90), a winch drive shaft (92), two translating cables (96), (98), a pushing mechanism (102), and multiple idlers (100). The winch drum (90) and winch drive shaft (92) are supported by the frame (68) in a position such that the axis of rotation of the winch drum (90) is transverse to the longitudinal axis (70) of the support structure (39). The translating cables (96), (98) each form a loop extending from the winch drum (90), to the back end (66) of the support structure (39), along a path parallel to the longitudinal axis (70) of the support structure (39), to the front end (64) of the support structure (39), and back to the winch drum (90). The pushing mechanism (102) has a pushing face located in a plane normal to the longitudinal axis (70) of the support structure (39) and is engagable with a new pipe section (82). The pushing mechanism (102) is located between the translating cables (96), (98) and is attached to them in their longitudinal portions. The pushing mechanism (102) includes a reversible pushing head (106) and a pushing beam (104). Multiple idlers (100) are provided for guiding the loops formed by the translating cables (96), (98). Additional components include gear reduction components (120), a damping device (180), a pipe elevator mechanism (154), load monitors and recorders, pressure regulators, and an operator's station (151).

20 Claims, 8 Drawing Sheets

PIPE INSERTION MACHINE AND METHOD

FIELD OF THE INVENTION

The present invention relates to pipe insertion machines, and in particular, to pipe insertion machines for installing new pipe sections into existing pipelines.

BACKGROUND OF THE INVENTION

In the 1950's and '60's, a number of communities laid steel-reinforced concrete pipes for their main sewer lines, expecting them to be durable enough to last virtually forever. Recently, communities are finding that these pipelines have deteriorated significantly. It is only now being discovered that sulfide gases in sewage chemically attack the lime in concrete and corrode a small portion of the pipe each year. In some cases, sulfide gases rise out of the sewage and concentrate at the upper inner surfaces of the pipe, accelerating the deterioration of the upper surface. Once the concrete has deteriorated, the sulfide gases and sewage corrode the steel reinforcements. At some point, the pipeline can become so weakened as to collapse. Portions of the pipe crown fall into the flow conduit and sink to the bottom, where they obstruct the flow of sewage. Structures above the pipeline may then collapse with the undermined soil over the outfall line, potentially cutting off the entire fluid flow. Even if the pipeline does not collapse, it may leak raw sewage in the surrounding ground, potentially polluting ground water sources.

The existing method of large pipe restoration is limited to unearthing the pipe and replacing deteriorated portions or, in some cases, the entire pipeline. The cost of unearthing old pipe and laying in a new pipe is enormous, in addition to the expense of constructing a temporary sewage system. In some cases, it is not possible to access the pipeline from above ground, because buildings and other structures have been built on top of the pipeline (in the expectation that the pipeline would never need repair). Either the structure must be removed, or the pipeline must be approached horizontally, by digging under the building. Either case requires additional time and expense. Since existing main sewer lines are typically many miles long, there could be a considerable number of such structures. Therefore, not only is the cost of restoring new pipe expensive (especially steel-reinforced concrete pipe), but also in highly populated areas, it can be very disruptive and time consuming.

There exist several pipe restoration methods for small diameter pipes (24 inches and smaller). However, these methods require by-pass pumping, thus requiring the operations line to be taken out of service. Arrangements for service re-connections must be coordinated while rehabilitating the line. These methods include: in-situ form where an existing pipeline is lined with an impregnated fiberglass thermopolyester rest sock; pipe-within-a-pipe where a PVC pipe is pre-shrunk and heated to form an interior wall within an existing pipeline; U-liner method where a polyethelene pipe is formed inside an existing pipeline using steam; and, installing pipe sections method where hydraulic cylinders having sectional insertion components, install pipe sections consisting of PVC, steel, polyethelene, etc. within the out-of-service line.

For small-diameter pipes, it is currently known to restore an existing pipeline by pushing rigid pipe sections into the existing pipeline, end-to-end, without having to take the line out of service. First, the existing pipeline is cleaned, or at least cleared, of obstructing debris. Next, a pipe insertion machine pushes rigid new pipe sections, typically fabricated of steel, plastic, or other suitable material, into the existing pipeline. The new sections are pressed intermittently into the pipeline by means of a hydraulic ram. The new pipe section may be shoved in at an existing pipe opening (i.e., a manhole) or an opening may be created by unearthing a portion of the pipe and cutting a coupon from its upper surface.

In general, pipe diameters of 30 inches and larger cannot be periodically taken out of service for repairs, due to the large flow volumes and connecting trunk outfalls. Therefore, the above by-pass pumping methods are not viable options. The insertion method above is not available either for use with large diameter pipes due to the lack of an insertion machine powerful enough to push a large pipe train. The most powerful known pipe insertion machine provides only about 100 tons of axial force. For the large diameter pipes (over 7 feet), upwards of 300 to 500 tons of axial force are needed. Current machines may not easily be resized for the proportions of large-diameter pipes, because many of the components are not produced in larger sizes. If the components were available, the resulting machine would be quite slow, because existing designs have power transmission methods that limit the axial load capability (i.e., the translational power is provided directly from the hydraulic power.) For these reasons, the pipe insertion method of pipeline restoration has not hereto been available for use with very large diameter pipes.

Thus, a need exists for a pipe insertion machine that may be used to safely control large diameter pipe insertion into a high flow existing pipeline environment. The ideal pipe insertion machine should be powerful enough to quickly push large-diameter new pipe sections into an existing pipeline without disrupting flow or altering the environment of the collection network. The present invention is directed to fulfilling this need.

SUMMARY OF THE INVENTION

In accordance with the present invention, a pipe insertion machine for quickly inserting new pipe sections into an existing pipeline is provided. Pipe insertion machines formed in accordance with the present invention may be used for new pipe section diameters of 24 to 108 inches, requiring up to 500 tons of axial thrust. A pipe insertion machine formed in accordance with the present invention includes a support structure with translating components and gear reduction components attached thereto. The support structure is placed in a steel pit over a portion of the existing pipeline having a coupon opening. The translating components are capable of engaging an end of the new pipe section and pushing it into the existing pipeline. External hydraulic power is provided to the gear reduction components which multiply the torque to translate the translating components.

In accordance with further aspects of this invention, the support structure includes a plurality of support beams rigidly connected to form a frame. The support structure also includes a first end, a second end, and a longitudinal axis that is parallel to the existing pipeline.

In accordance with still further aspects of this invention, the translating components include a winch drum, a winch drive shaft, two translating lines cables, a pushing mechanism, and multiple idlers. The winch drum and winch drive shaft are supported by the frame in a position such that the axis of rotation of the winch drum is transverse to the longitudinal axis of the support structure. The translating cables each form a loop extending from the winch, to the first end of the support structure, along a path parallel to the longitudinal axis of the support structure, to the second end of the support structure, and back to the winch. The translating cables are guided by the idlers. When the winch drum is rotated, the translating cables are caused to wrap and unwrap around the winch drum simultaneously. The pushing mechanism has a pushing face oriented in a plane normal to the longitudinal axis of the support structure and is engagable with an end of the new pipe section. The pushing mechanism is located between the translating cables and is attached to them in the longitudinal portions. The pushing mechanism preferably includes a reversible pushing head and a pushing beam.

In accordance with yet further aspects of this invention, gear reduction components include two gear-and-pinion pairs. These pairs are rotatably attached to the support structure. The pinion of the first pair accepts external hydraulic power and the gear of the first pair multiplies its torque. The pinion of the second pair is connected to the gear of the first pair in a countershaft arrangement. The gear of the second pair is attached to the winch drive shaft and multiplies torque received from the pinion of the second pair. In this way, external rotational power is provided to the winch in a high torque, low rotation form.

In accordance with other aspects of the present invention, a clamping device is provided to aid in steadying the new pipe sections being inserted into the existing pipeline. There are preferably two clamping devices, one located at each end of the support structure, for enabling the pipe insertion machine to control new pipe sections being pushed into the existing pipeline in either direction.

In accordance with still other aspects of the present invention, a pipe elevator mechanism is provided for lowering a new pipe section into the existing pipeline. The pipe elevator includes two pairs of vertical housing members between which two slings are attached and may slide in order to lower the new pipe section into the existing pipeline.

In accordance with yet other aspects of the present invention, a digital monitor and recorder are provided to monitor the loads of the pipe insertion machine and record them. A pressure regulator is also provided as a safety measure in order to stop the pipe insertion machine should the loads become excessive.

In accordance with still other aspects of the present invention, the pipe insertion machine includes structural components for mounting a second winch mechanism for use in cleaning and clearing the existing pipeline prior to pipe insertion.

In accordance with further aspects of the present invention, the pipe insertion machine is operated by lowering a new pipe section into an existing pipeline using the pipe elevator mechanism, engaging the new pipe section bell end with the pushing mechanism, and translating the pushing mechanism to push the new pipe section into the existing pipeline. The pushing mechanism is connected to the translating cables that are attached to the winch. Translation of the cables causes the simultaneous wrapping and unwrapping of the translating cables at the winch. The step of translating further includes the reduction of rotational speed via the gear reduction components, in order to multiply the available torque to the winch.

In accordance with still further aspects of the present invention, the pipe insertion machine may be operated to push new pipe sections into the existing pipeline in both directions, i.e., pushing a first pipe section in one direction, then reversing the orientation of the pushing mechanism and pushing a second pipe section in the opposite direction.

The present invention provides a new and distinctly better pipe insertion machine. In particular, the pipe insertion machine has been optimized to provide enough axial thrust for use with large diameter pipe sections existing pipelines. The present invention allows the controlled insertion of large diameter pipe sections, without having to interrupt the flow of fluid through the existing pipeline. In addition, new pipe sections may be inserted in both directions of the existing pipeline, thus making the present invention more time efficient.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
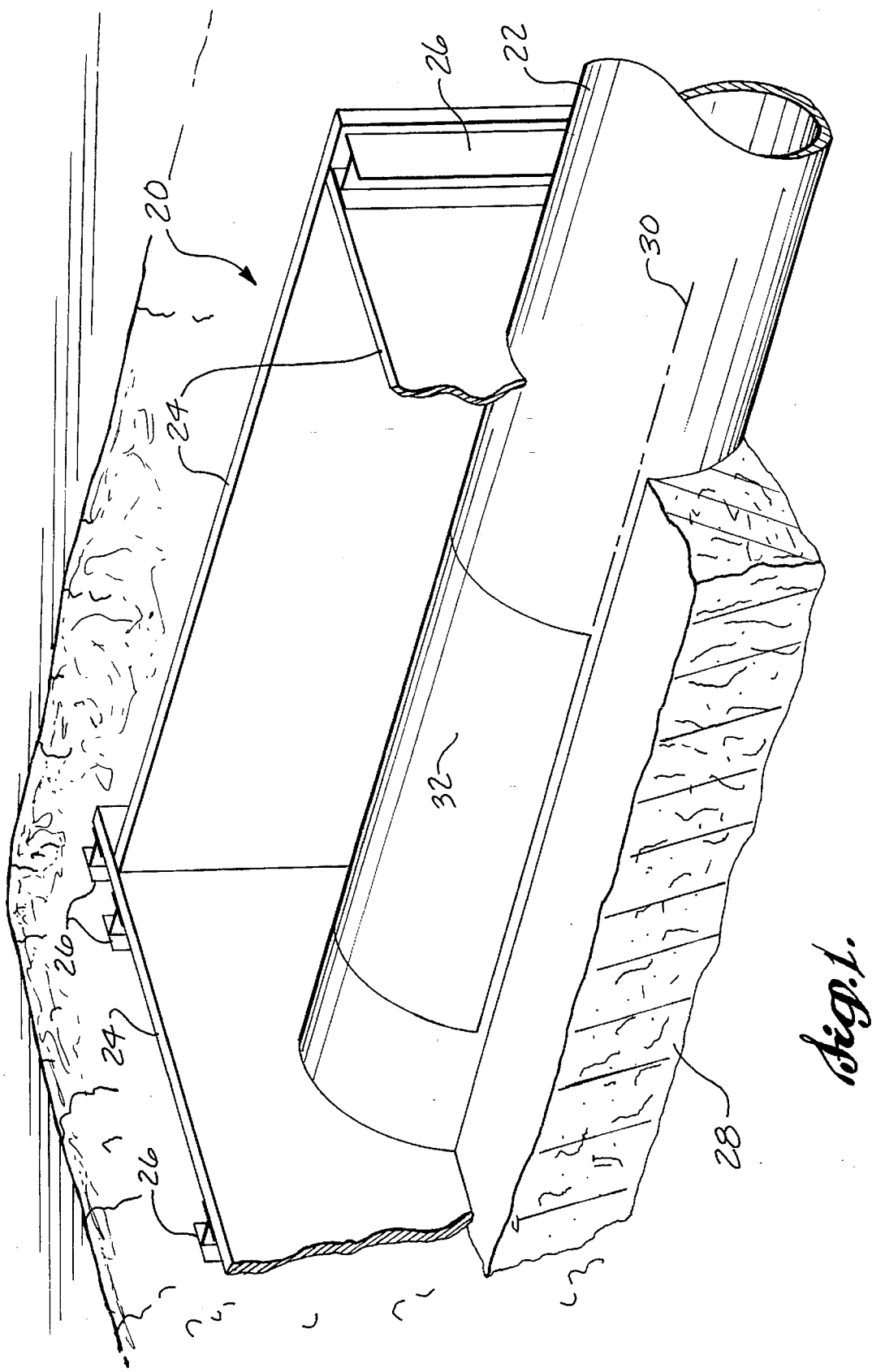
FIG. 1 schematic of a pipe insertion pit within which a pipe insertion machine formed in accordance with the present invention may be placed.

FIG. 1 is an isometric schematic of a steel pit 20 within which a pipe insertion machine formed in accordance with the present invention may be placed. A steel pit 20 is useful for supporting the pipe insertion machine and countering forces developed during its use. The pit also serves to block dirt from the sides of the pit from falling into the pipe insertion machine, maintaining both the machine and the pit.

The steel pit 20 generally includes a concrete foundation 28, four surrounding steel walls 24, and a number of steel reinforcing soldier piles 26. Once a portion of the existing pipeline 22 has been unearthed, the reinforcing soldier piles 26 are secured vertically in the ground at various locations around the wars of the pit 20. The foundation 28 is poured about the lower half of the existing pipeline 22. Steel walls 24 are attached to the reinforcing beams and rest vertically upon the foundation 28, thus forming an enclosure around the area of pipe to be opened.

FIG. 1 further shows a coupon 32 cut from the existing pipeline 22. The coupon 32 is placed outside of the pit 20 before the pipe insertion machine is placed on the foundation 28 over the coupon hole. The length of the coupon 32 along the pipeline 22 is longer than the length of a single new pipe section 82 (shown in FIG. 8) to be installed, facilitating the maneuvering of the new pipe section 82 into the existing pipeline 22 and engaging of the new pipe section 82 with the pipe insertion machine. The side cuts of the coupon 32 are generally along the springline 30 of the pipeline 22.

Figure 2:
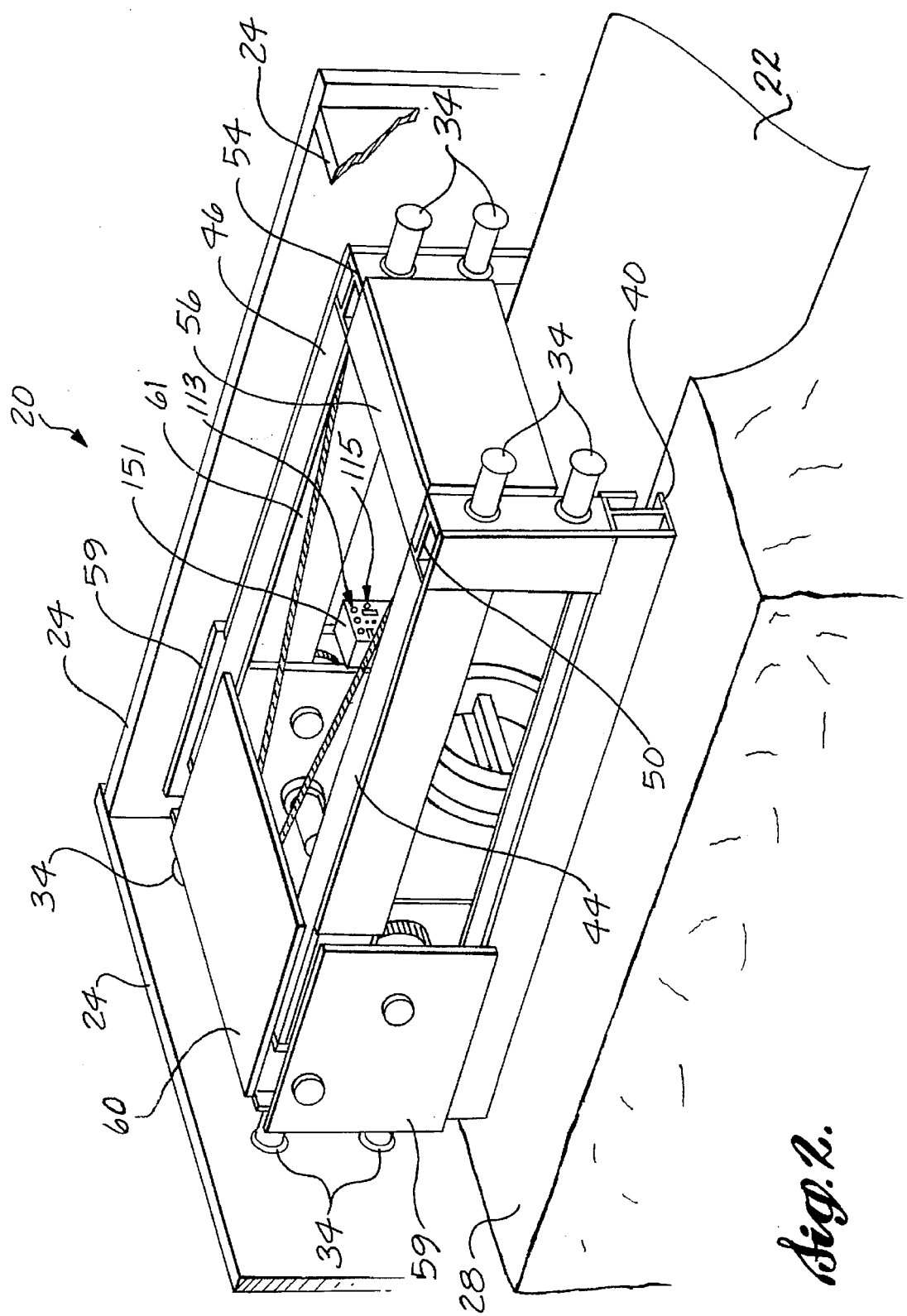
FIG. 2 is an isometric schematic of a pipe insertion machine formed in accordance with the present invention.

FIG. 2 is an isometric schematic of a pipe insertion machine formed in accordance with the present invention, and suitable for use in a steel pit 20 such as shown in FIG. 1. In general, the pipe insertion machine includes a support structure 39, translating components 80, and gear reduction components 120. The support structure 39 (shown in FIG. 3) is attached to the pit's concrete foundation 28, over the portion of pipeline 22 having the removed coupon 32. The translating components 80 (shown in FIG. 4) and the gear reduction components 120 (shown in FIG. 5) are generally housed within and connected to the support structure 39. The translating components 80 are capable of engaging the new pipe section 82 and pushing it into the existing pipeline 22, using torque developed by the gear reduction components 120. External hydraulic power is provided to the gear reduction components 120 in an amount appropriate to the specific application. Walkways (not shown) may be provided at various locations on the present invention for access to the pipe insertion machine.

The pipe insertion machine of the present invention may be sized to accommodate new pipe section diameters ranging from about 24 inches to at least 108 inches. The description given below includes preferred characteristics for constructing a pipe insertion machine of the present invention to have a large amount of axial thrust (up to at least 300 tons, 20 linear feet per minute). For most applications, this amount of axial thrust should be sufficient. If a particular application requires more axial thrust, then slight modifications may be made to the increase axial thrust to up to 500 tons. These modifications are noted below. If a particular application does not require high axial thrust, then the pipe insertion machine components may be scaled to the appropriate mount. Therefore, the preferred characteristics are not to be construed to limit the scope of the present invention, but only to aid in the understanding of a pipe insertion machine of the present invention in a high axial thrust (at least 300 tons) embodiment.

Figure 3:
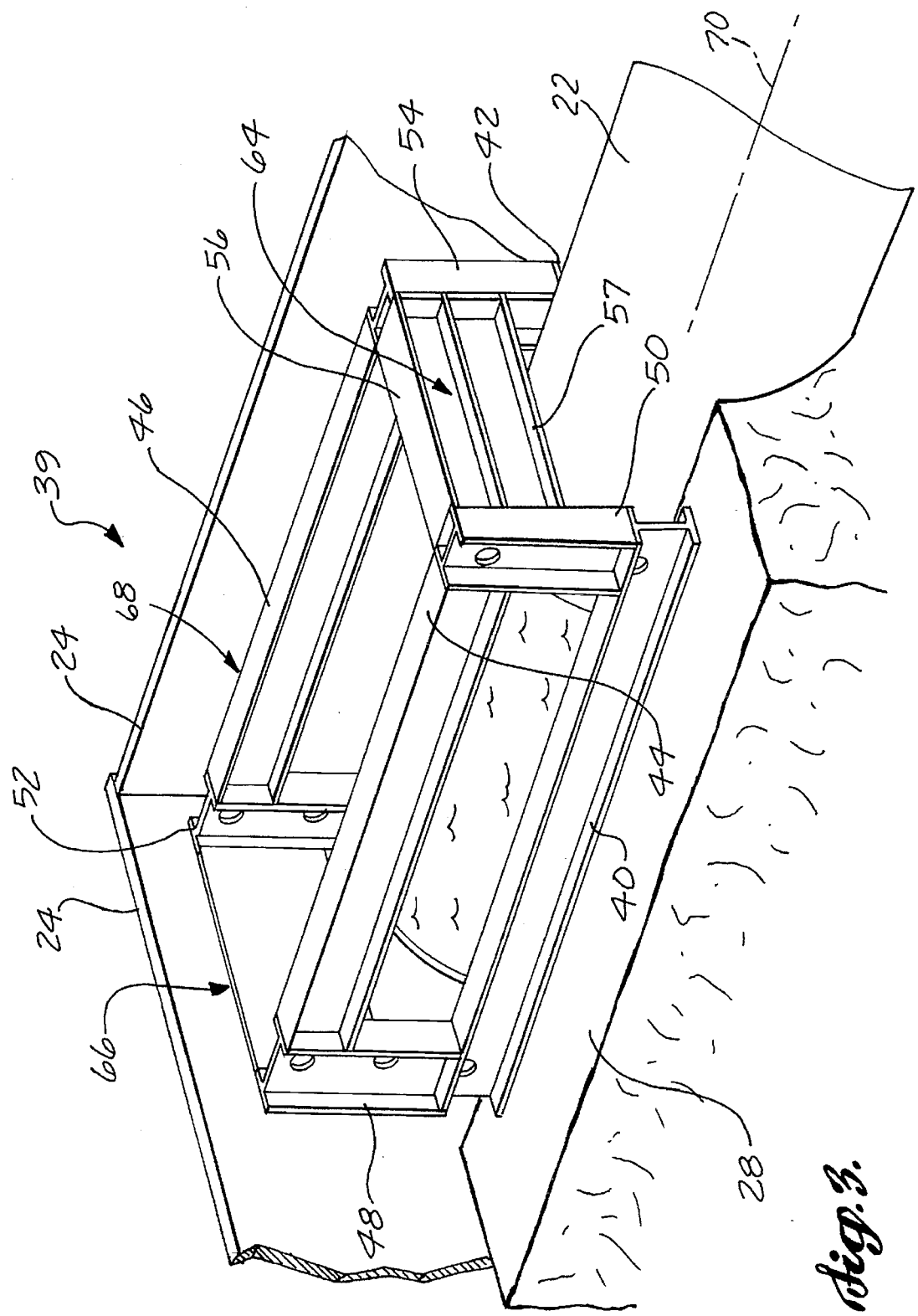
FIG. 3 is an isometric schematic of a support structure of a pipe insertion machine formed in accordance with the present invention.

In more detail, FIG. 3 is an isometric schematic of a support structure 39 of a pipe insertion machine formed in accordance with the present invention. The support structure 39 is placed over a cutout in an existing pipeline 22, as described above. Because of the large forces developed by the pipe insertion machine, it is preferable to attach the support structure 39 directly to the foundation 28 and to place reinforcing pipes 34 between the machine and the steel walls 24 (as shown in FIG. 2).

The support structure 39 is generally comprised of a plurality of support beams 40, 42, 44, 46, 48, 50, 52, 54, 56, 57 preferably arranged in a substantially rectangular array to form a frame 68. While a number of different types of support beams may be used, in a number of different arrangements; the preferred embodiment of a rectangular array support structure 39 according to the present invention includes: first and second lower longitudinal beams 40, 42; first, second, third, and fourth vertical beams 48, 50, 52, 54; first and second upper longitudinal beams 44, 46; and two front cross beams 56, 57. When installed over the existing pipeline 22, the support structure 39 has a longitudinal axis 70 parallel to the existing pipeline 22. Any number of additional support beams and braces may be added, as necessary.

The first and second lower longitudinal beams 40, 42 are located parallel to one another. The spacing between the first and second lower longitudinal beams 40, 42 is roughly as great as the diameter of the existing pipeline 22. The first and second vertical beams 48, 50 are each fixedly attached to an end of the first lower longitudinal beam 40. The third and fourth vertical beams 52, 54 are each fixedly attached to an end of the second lower longitudinal beam 42. The first and second upper longitudinal beams 44, 46 are located substantially parallel to one another. The first upper longitudinal beam 44 is fixedly attached to the first and second vertical beams 48, 50 at their upper ends. The second upper longitudinal beam 46 is fixedly attached to the third and fourth vertical beams 52, 54 at their upper ends. The two front cross beams 56, 57 connect the second and fourth vertical beams 50, 54 at their upper ends in an orientation normal to the first and second upper longitudinal beams 44, 46. The location of the two front cross 56, 57 beams defines a front end 64 of the support structure 39. The location opposite the front end 64 defines a back end 66 of the support structure 39. In this way, the support beams form a generally rectangular frame 68.

The support structure 39 may also include a number of steel plates (as shown in FIG. 2). These plates, such as an upper side plate 59 may be used as additional supporting structure for certain translating components 80 other plates, such as winch plate 60, may be used to shield certain components or block debris from falling into the machine. Plates may also be added to retain a failed component, such as a cable plate 61, in order to protect workers should a component fail.

In the preferred embodiment, all support beams are I-beams formed of structural steel. The preferred minimum yield strength is Fy=36 ksi, with a tensile strength of 58 to 80 ksi. The overall preferred size of the support structure 39 is roughly 11' wide by 12' high by 30' long, most I-beams being W36×150 beams. The support beams are preferably fillet welded to one another at their connection locations.

Figure 4:
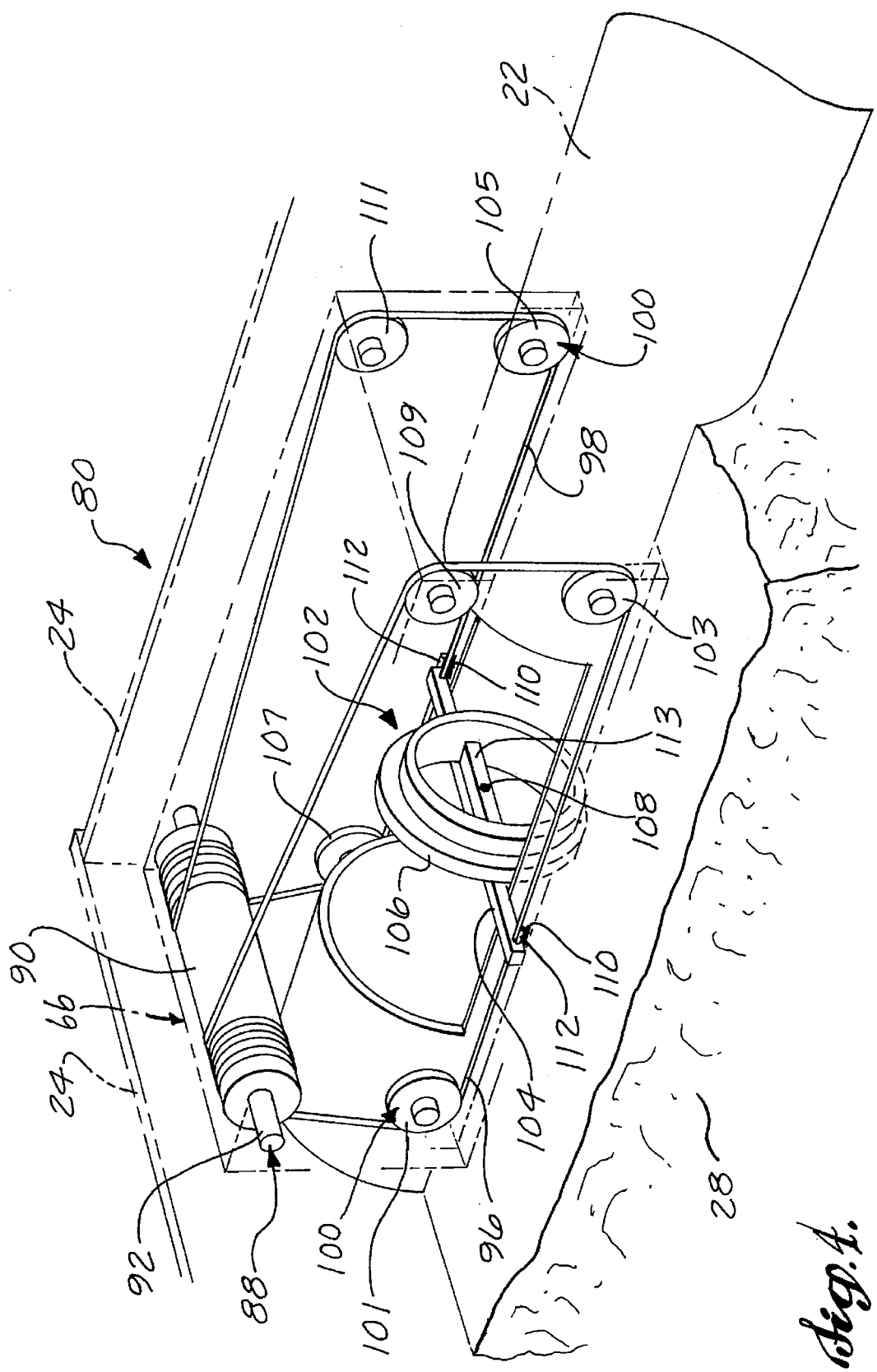
FIG. 4 is an isometric schematic of translating components of a pipe insertion machine formed in accordance with the present invention.

FIG. 4 is an isometric schematic view of translating components 80 of a pipe insertion machine formed in accordance with the present invention. The translating components 80 include a winch 88; first and second translating cables 96, 98; a pushing mechanism 102; and multiple idlers 100. In general, a new pipe section 82 is engaged with the pushing mechanism 102 which is attached to the translating cables 96, 98. The cables 96, 98 are attached to the winch 88 and guided by the idlers 100. Rotation of the winch 88 causes translation of the cables 96, 98, forcing the pushing mechanism 102 to push the new pipe section 82 into the existing pipeline 22.

More specifically, the winch 88 includes a winch drum 90 equipped with a winch drive shaft 92. The winch drive shaft 92 passes through the winch drum 90 and extends from both ends of the winch drum 90. The winch drive shaft 92 is rotatably attached to the support structure 39, preferably near its back end 66. The axis of rotation of the winch 88 is transverse to the longitudinal axis 70 of the support structure 39.

The preferred winch drum 90 is about 48 inches in outer diameter and roughly 11 feet long, and is bored to accept a 10 inch winch drive shaft 92 of 4140 steel, or equivalent thereof. Various known attachment methods may be used to rotatably connect the winch drive shaft 92 to the support structure 39; however, the preferred attachment method is to use a bearing and bearing end cap arrangement with the ends of the winch drive shaft 92 passing through the first and third vertical support beams 48, 52 and the upper side plates 59. Each bearing end cap utilizes grade 8 bolts and is assisted by triple ¾ inch fine thread tapped to the drive shaft 92.

The first and second translating cables 96, 98 each have first and second ends. The first ends of the first and second translating cables are attached to opposite ends of the winch drum 90, so that they extend in like directions from the winch drum 90. The second ends of the first and second translating cables 96, 98 return to the winch drum 90 and are attached to it, though, in a direction extending opposite the first ends. In this way, first and second loops are formed by the first and second translating cables 96, 98, respectively.

The first and second loops each extend downward from the winch 88 around a lower portion of the back end 66, along paths parallel to the longitudinal axis 70 of the support structure 39, to a lower portion of the front end 64, up to an upper portion of the front end 64, and then back to the winch 88. The portions of the first and second translating cables 96, 98 traveling along the longitudinal path are a horizontal distance apart roughly as wide as the diameter of the existing pipeline 22. As the cables 96, 98 translate, one end of each cable unwinds from the winch drum 90, while at the same time the other end of the each cable rewinds onto the winch drum 90. This is true regardless of which direction the winch drum 90 is rotating.

It is to be understood that, depending on the precise application, any suitable line may be used to perform the function of the cable, e.g., a rope, a chain, etc. Such a variation will require only minor modifications, as would be understood by those skilled in the art. The preferred translating lines for a high axial thrust embodiment of the present invention are cable, each being roughly 2.5 inches in diameter with a minimum breaking strength of at least 365 tons. Each cable should be constructed of 6×30 flattened strand rope, monitor AA IWRC, with an independent wire rope core. Each cable should include 6 woven cable strands constructed of 30 independent wire strands with a right regular lay, with a bright finish and performing. No more than 18 wires should be outside. Each cable should be capable of wrapping a 48 inch sheave without permanent deformation. The cable weight should be a minimum of 11.8 pounds per foot. The attachments of the first and second ends of the cables 96, 98 to the winch drum 90 each preferably comprise three eye bolts installed perpendicularly into the drum 8.375 inches apart, followed by three cable wraps around the winch drum 90 in each direction to provide simultaneous wrapping and unwrapping.

Multiple idlers 100 are positioned within the support structure 39 to guide the first and second translating cables 96, 98. The position and number of the idlers 100 will vary depending on the precise location of the winch 88 and the range of pipe diameters for which the pipe insertion machine is being built. In the preferred embodiment (i.e., large diameter, high axial thrust) there are six idlers: first, second, third, and fourth lower idlers 101, 103, 105, 107; first and second upper idlers 109, 111.

The four lower idlers 101, 103, 105, 107 are rotationally attached to the support structure 39. One lower idler is located at each end of the lower longitudinal beams 40, 42. Each lower idler 101, 103, 105, 107 is oriented in a substantially vertical plane with an axis of rotation transverse to the longitudinal axis 70 of the support structure 39. The two upper idlers 109, 111 are rotationally attached to the support structure 39. One upper idler is located at each end of the second and fourth vertical support beams 50, 54 near the front end 64. Each upper idler 109, 111 is oriented in a substantially vertical plane with an axis of rotation transverse to the longitudinal axis 70 of the support structure 39.

Depending on the precise arrangement, any suitable guide may be used to perform the function of the idlers. For a high axial thrust embodiment of the present invention, however, the preferred guides are idlers, each being roughly 48 inches in diameter with a peripheral rail, and each bored to accept a doubled keyed 4.5 inch diameter idler shaft of 4140 steel, or equivalent thereof. Various known attachment methods may be used to rotatably connect the idlers to the support structure 39; however, the preferred attachment method is to use a bearing and bearing retainer arrangement with the idler shafts passing through a support beam and at least one steel plate. Each bearing retainer utilizes grade 8 bolts and is assisted by triple ¾ inch fine thread tapped to the idler shaft.

The pushing mechanism 102 includes a pushing head 106 and a pushing beam 104. The pushing beam 104 extends between the first and second translating cables 96, 98 at their longitudinal portions. The pushing beam 104 has first and second ends, each end being attached to one of the cables. The preferred attachment of the pushing beam ends to the first and second translating cables 96, 98 is via U-bolts 112, sometimes called clips. A small slide rod 110 is attached under each pushing beam end. The small slide rod 110 at the first end of the pushing beam 104 rests upon a portion of the first lower longitudinal beam 40. The small slide rod 110 at the second end of the pushing beam 104 rests upon a portion of the second lower longitudinal beam 42. The portions of the first and second lower longitudinal beams 40, 42 supporting the slide rods 110 of the pushing beam 104, having a skate (not shown) attached thereto, to reduce the friction of the pushing beam 104 as it is moved along the lower longitudinal beams 40, 42.

The pushing head 106 is mounted on the pushing beam 104 and translates as the beam 104 translates when the winch 88 is rotated. The pushing head 106 is generally a circular ring with a pushing face shaped to engage an end of new pipe section 82. The preferred pushing head and face shape has a protruding reduced diameter ring capable of engaging within the bell end 84 of a new pipe section 82. A head cross beam 113 is attached to the pushing head along the inner diameter of the pushing head 106.

In the preferred embodiment, the attachment of the pushing head 106 is reversible so that the pushing head 106 may be attached to either side of the pushing beam 104. This allows the pushing head 106 to be capable of pushing a new pipe section 82 in either direction (upstream or downstream) in the existing pipeline 22. The preferred attachment includes a pin 108 capable of passing through a bore in the center of the head cross beam 113 and a bore in the center of the pushing beam 104. The inserted pin 108 is oriented parallel to the longitudinal axis 70 of the support structure 39. Equivalent attachment methods may be used, such as a pivotable connection that allows the pushing head 106 to be rotated between sides of the pushing beam 104. A second preferred embodiment of the pushing mechanism 102 includes a second pushing head attached to the pushing beam 104 on a side opposite the first pushing head, to assist in providing both directions of insertion without having to reverse the pushing head position.

Figure 5:
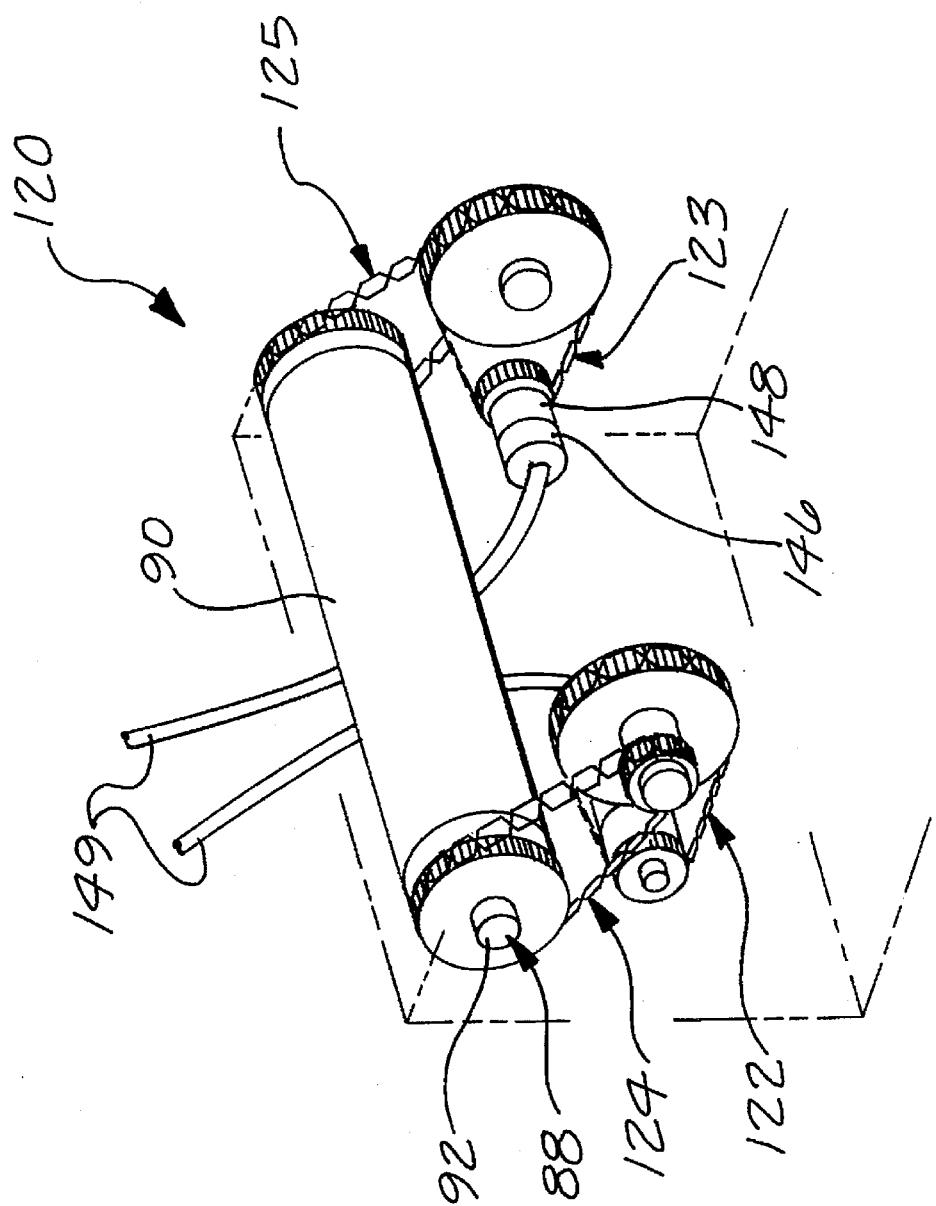
FIG. 5 is an isometric schematic of gear reduction components of a pipe insertion machine formed in accordance with the present invention.

FIG. 5 is an isometric schematic of the gear reduction components 120 of a pipe insertion machine formed in accordance with the present invention. The gear reduction components 120 generally include one or more gear-and-pinion pairs, depending on the amount of gear reduction (or torque) required for a particular application. In the preferred embodiment, there are two sets each of two gear-and-pinion pairs 122, 123, 124, 125, each pair having one gear and one pinion, rotatably connected by an endless chain. Each gear and pinion of each pair 122, 123, 124, 125 is rotatably attached to the support structure 39 in a bearing and bearing retainer arrangement. Each gear and pinion of each pair 122, 123, 124, 125 is located such that its axis of rotation is transverse to the longitudinal axis 70 of the support structure 39, and thier circular faces are oriented substantially vertically.

In both the first and second pairs 122, 123, the pinion is in rotational communication with an external power source, as discussed below. Each pinion of the third and fourth gear-and-pinion 124, 125 pairs is in rotational communication with the gears of the first and second gear-and-pinion pairs 122, 123, preferably in a countershaft arrangement. Each gear of the third and fourth gear-and-pinion pairs 124, 125 is in rotational communication with the winch 88 at an end of the winch drive shaft 92. In this manner, the gear reduction components 120 transmit external rotational power to the winch drum 90, causing the winch drum 90 to rotate.

Figure 8:
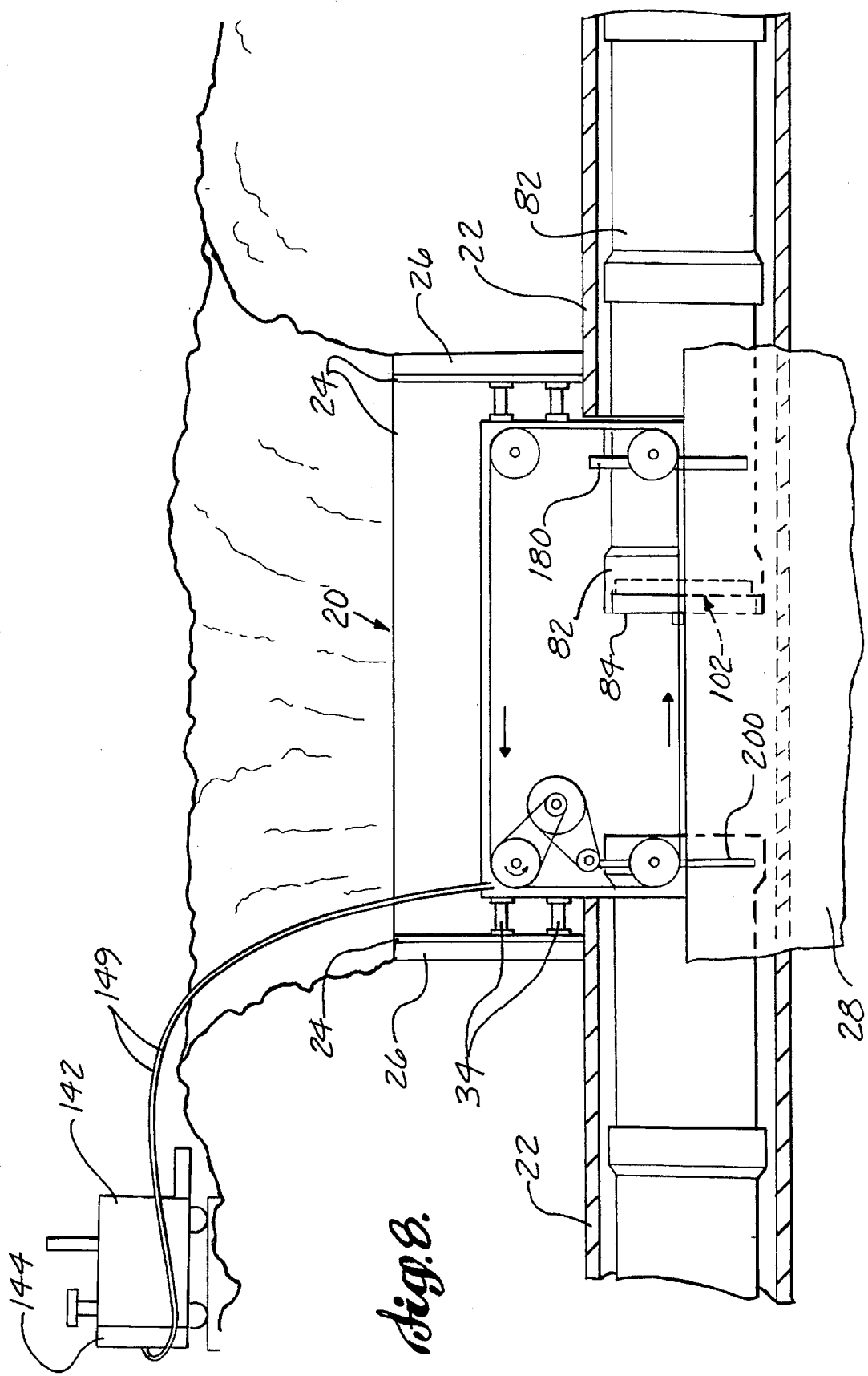
FIG. 8 is a partial cut-away side view schematic of a pipe insertion machine formed in accordance with the present invention.

Shown in FIGS. 5 and 8 are the preferred external power sources. A trailer-mounted remote power unit houses a basic diesel motor (e.g., a Cummins™ P450 power package). The remote power unit 142 provides mechanical power to hydraulic pumps 144 attached to the remote power unit 142. The hydraulic pumps 144 convert the mechanical power into hydraulic pressure and send the hydraulic pressure to hydraulic motors 146 (e.g., SMA™ motors) via hydraulic hoses 149. The hydraulic motors 146 connect to gear reduction boxes 148 (e.g., Fairtield™ transmissions). The gear reduction boxes connect to the pinions of the first and second gear-and-pinion pairs 122, 123. Alternatively, a shaft (not shown) may be added to connect the inward ends of the hydraulic motors 146 to one another.

Other power configurations are possible. For high axial thrust, the pipe insertion machine requires roughly 450 horsepower, 5000 psi of hydraulic pressure, and a hydraulic fluid flow rate of 60 gallons per minute. If axial thrusts of between 300 and 500 tons are needed, two transmissions (e.g., Fairfield™ T2A two-speed transmissions; not shown) may be coupled to the hydraulic motors to multiply the available torque by four.

In addition to the above components, means 113 are provided that monitor and record all loads seen at the cables and the pushing head. Pressure regulators 115 are also included interrupt the flow of hydraulic power to the pipe insertion machine should the loads become excessive. An operator's station 151 (shown in FIG. 2) is provided, preferably located near or on the present invention for controlling all aspects of the pipe insertion machine, including the power, the translation of the translating components, the pipe elevator, the clamping device, the monitoring and recording of loads, the regulation of pressure, etc.

Figure 6:
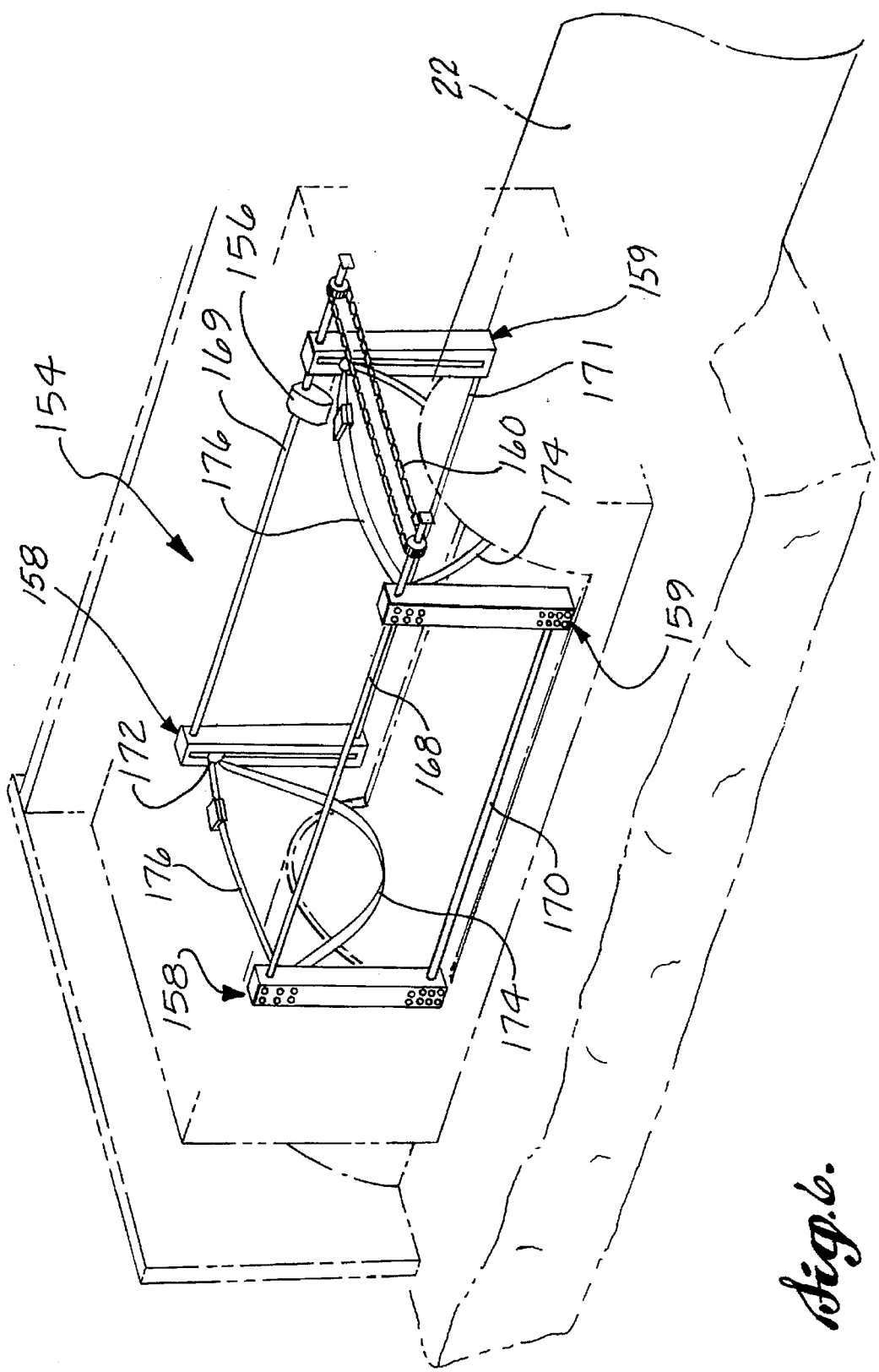
FIG. 6 is an isometric schematic of an elevator mechanism of a pipe insertion machine formed in accordance with the present invention.

FIG. 6 is an isometric schematic of a pipe elevator mechanism 154 of a pipe insertion machine formed in accordance with the present invention. The elevator mechanism 154 includes two vertical housing member pairs 158, 159; first, second, third, and fourth drive shafts 168, 169, 170, 171; a drive motor and gear box 156; and a timing chain 160. The ends of the first and second drive shafts 168, 169 are rotatably attached to the front end 64 of the support structure 39.

Each vertical housing member pairs 158, 159 is attachable at various points along the inside of the support structure 39. The vertical housing members themselves preferably are attached to the support structure 39 at both the member's upper and lower ends using a nut and bolt arrangement. Each vertical housing member includes an internal sling connector 172 to which one end of a rachet strap 176 and one end of a cargo strap 174 are connected. The rachet straps 176 and cargo straps 174 are capable of cradling a section of new pipe 82. Each sling connector 172 is attached to an internal endless chain (not shown) that translates vertically within each housing member. The internal endless chains are translated upon internal sprockets (not shown) located at each end of each vertical housing member. The rotational orientation of the internal sprockets is such that their axes of rotation is parallel to the longitudinal axis 70 of the support structure 39.

The first drive shaft 168 connects the upper internal sprockets of one side of each vertical housing member pairs 158, 159. The third drive shaft 170 connects the same side's lower internal sprockets. The second drive shaft 169 connects the upper internal sprockets of the other side of each vertical housing member pairs 158, 159. The fourth drive shaft 171 connects the same side's lower internal sprockets. Therefore, as the drive shafts rotate, the internal sprockets to which they are connected are caused to rotate.

The drive motor and gear box 156 is attached to the second drive shaft 169 and the timing chain 160 rotatably interconnects the first and second drive shafts 168, 169. The drive motor and gear box 156 is powered by an external power source. The timing chain 160 is located near the front end 64 of the support structure 39, away from where the new pipe section 82 would be positioned in the pipe elevator mechanism 154. The motor and gear box 156 cause the second drive shaft 169 to rotate, and the second drive shaft 169 causes the first drive shaft 168 to rotate via the timing chain 160. In this manner, the drive shafts 168, 169, 170, 171, timing chain, and the internal endless chains provide synchronized travel between the sling connectors 172 of each vertical housing member pair 158, 159 and between the sling connectors 172 within each vertical housing member pair 158, 159.

To operate the elevator mechanism 154, a new section 82 of pipe is placed on the cargo straps 174 while in the raised position. The rachet straps 176 are secured over the top of the new pipe section 82. The drive motor and gear box 156 is powered to rotate the second drive shaft 169. The rotation of the second drive shaft causes the timing chain 160 to rotate the first drive shaft 168. The rotations of the first and second drive shafts 168, 169 cause the rotation of the upper internal sprockets, which further causes the translation of the internal endless chains. Thus the sling connectors 172, by way of their connection to the endless internal chains, and the new pipe section by way of its resting in the cargo straps 174 which are attached to the sling connectors 172; are lowered into the existing pipeline 22. Once the new pipe section end is secured (as described below), the rachet and cargo straps 176, 174 are removed.

Figure 7:
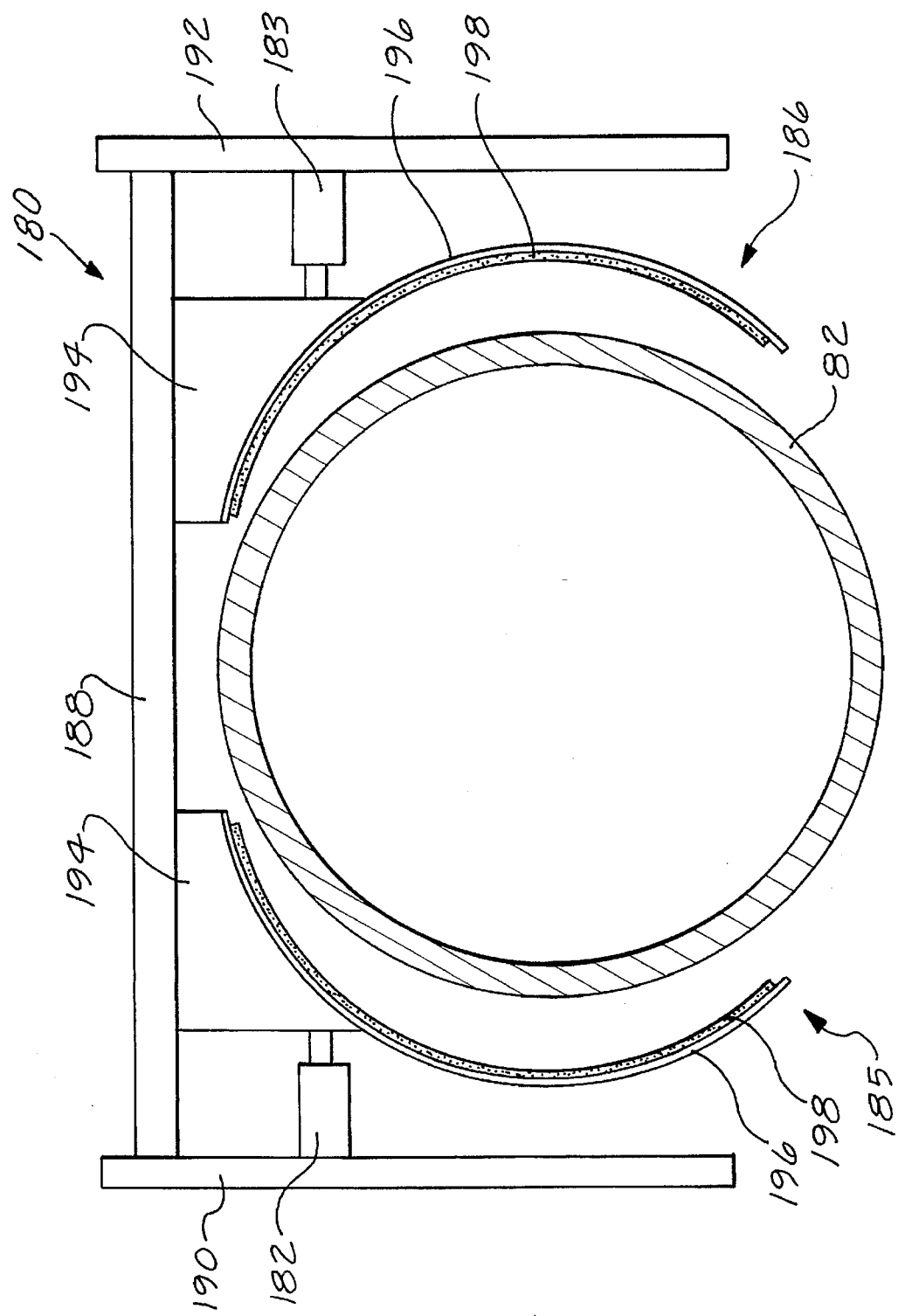
FIG. 7 is a front view of a clamping device of a pipe insertion machine formed in accordance with the present invention.

FIG. 7 is a from view of a damping device 180 of a pipe insertion machine formed in accordance with the present invention. The damping device 180 is provided to aid in steadying the new pipe sections 82 being inserted into the existing pipeline 22. This is useful if the flow of the fluid in the existing pipeline 22 is fast, or if the new pipe section 82 is tending to float in the fluid of the existing pipeline 22. The damping device 180 includes a frame, two hydraulic cylinders 182, 183, and two jaws 185, 186.

The frame includes a slotted box tube 188 extending roughly the inner width of the support structure 39 and attached at one end to a first channel 190 and at the other end to a second channel 192. The frame is attached to the lower portion of that end of the support structure 39 to which new pipe sections 82 are to be inserted. If the present invention is to be operated to push new pipe sections 82 in both directions alternatingly, then a second damping device 200 may be attached to the other end of the support structure 39. The preferred attachment of the damping device 190, 200 to the support structure 39 uses four 0.75 inch bolts to mount the frame to the end of the support structure 39.

The two jaws 185, 186 each include a guide plate 194, an arcuate arm 196, and a rubber pad 198. The jaws 185, 186 are positioned beneath the slotted box tube 188 with their guide plates 194 being slidably engaged within the slot of the slotted box tube 188. Each arcuate arm 196 is attached at a portion of its upper convex face to a guide plate 194, such that the concave face of the arcuate arms 196 face inward, toward each other. The rubber pads 198 are attached to the arcuate arms 196 on the concave face of the arcuate arms 196. The first hydraulic cylinder 182 is positioned between the first channel 190 and the guide plate of the first jaw 185, with an axis generally parallel to the slotted box tubing 188. The second hydraulic cylinder 183 is positioned between the second channel 192 and the guide plate of the second jaw 186, also generally parallel to the slotted box tubing 188.

In operation, the hydraulic cylinders 182, 183 are powered to pull the two jaws 185, 186 apart, i.e., away from each other. A first new pipe section is lowered into the existing pipeline 22 such that one end is positioned between the clamping device jaws 185, 186. The hydraulic cylinders 182, 183 are powered to push the two jaws 185, 186 toward each other, thus clamping around the new pipe section 82. Once the pushing mechanism 102 has been engaged to the other end of the first new pipe section, the jaws 185, 186 are pulled apart, and the translating components 80 push the new pipe section into the existing pipeline 22. Once the translating components 80 have reached the end of their stroke, the clamping device 180 is again powered to clamp the two jaws 185, 186 together, around the other end of the new pipe section. A second new pipe section is lowered into the existing pipeline 22 and is engaged at one end to the first pipe section being held by the damping device 180. The process continues until all new pipe sections are inserted.

FIG. 8 is a side view schematic of a pipe insertion machine formed in accordance with the present invention. The pipe insertion machine is shown in operation, pushing a new pipe section 82 into a preceding new pipe section within the existing pipeline 22.

To prepare the site for use of a pipe insertion machine, a steel pit 20 is formed around an existing pipeline 22, as discussed above. The pipe insertion machine is lowered into the steel pit 20, over a coupon opening previously prepared in the existing pipeline 22. The pipe insertion machine is then secured to the concrete foundation 28. Once the machine is in position, steel reinforcing pipes 34 (shown in FIG. 2) are placed horizontally between the steel walls 24 and the outside surfaces of the pipe insertion machine. The steel reinforcing pipes 34 assist in stabilizing the pipe insertion machine during use. Next, the existing pipeline 22 is cleared of any debris that has collected along the bottom of the pipeline 22. The easiest clearing method is to run a mechanical cleaning head, or mandrel device, through the pipeline 22. This clearing step may be accomplished before the pipe insertion machine is placed in the steel pit 20; however, the pipe insertion machine may easily be modified to perform this task by simply attaching a separate winch to the insertion machine to perform the clearing task.

To begin operation of the pipe insertion machine, a first new pipe section is first lowered into the existing pipeline 22 by the pipe elevator mechanism 154. The first clamping device 180 is then used to damp the spigot end of the first new pipe section, thus holding it in place so that the pushing mechanism 102 may be engaged to the bell end of the pipe section. Once engaged, the elevator mechanism straps 174, 176 and the first clamping device 180 are released, allowing the pushing mechanism 102 to proceed with pushing the first new pipe section forwardly. This is accomplished by the external power causing the winch 88 to rotate, which causes translation of the cables 96, 98 and translation of the pushing mechanism 102. This results in the new pipe section being forced into the existing pipe 22. The first new pipe section is pushed forward until the first damping device 180 reaches the bell end of the first new pipe section. Once at the bell end, the first damping device 180 clamps down to hold the first new pipe section while the pushing mechanism 102 is disengaged from the first new pipe section.

The pushing mechanism 102 is reversed by placing the pushing head 106 on the other side of the pushing beam 104. A second new pipe section is lowered into the existing pipeline 22 by the elevator mechanism 154. This second new pipe section is oriented in the opposite direction so that it also may be engaged with the pushing mechanism 102 at its bell end. The second new pipe section is pushed into the existing pipeline 22 in a manner similar to the first new pipe section, only in the opposite direction. Once the bell end of the second pipe section is secured by a second clamping device 200, the pushing mechanism 102 is again reversed in orientation.

Next, a third new pipe section is lowered into the existing pipeline 22 by the elevator mechanism 154. The spigot end of the third new pipe section is fitted into the bell end of the first new pipe section and the pushing mechanism 102 is engaged with the bell end of the third new pipe section. The elevator mechanism straps 174, 176 and the first damping device 180 are released, allowing the pipe insertion machine to push the third and first new pipe sections further into the existing pipeline 22. A fourth new pipe section is pushed in behind the second new pipe section, and the cycle is repeated.

In this manner, two separate new pipe section trains are pushed into the existing pipeline 22, extending in opposite directions from the pipe insertion machine. (Of course, the pipe insertion machine may be used to push new pipe sections in only one direction, the return stroke simply not including a new pipe section.) When all new pipe sections have been inserted, grout (or its equivalent) is used to seal the annular space between the outside of the new pipe section and inner wall of the existing pipeline 22, on both pipe trains. This causes the pipeline 22 fluid to flow only through the new pipe section. Once the existing pipeline 22 has been grouted, a closer section with two spigot ends is fitted and sealed between the two bell ends of the last two new pipe sections inserted, thus completing the installation of the new pipe into the existing pipeline 22.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pipe insertion machine for pushing new pipe sections into an existing pipeline, the pipe insertion machine comprising:
   (a) a support structure; and
   (b) translating components including:
      (i) a winch supported by the structure, the winch having a winch drum;
      (ii) translating lines in rotational communication with the winch, each translating line having first and second ends attached to the winch drum in opposite angular directions, each translating line forming a loop;
      (iii) a pushing mechanism having a pushing head engagable with an end of the new pipe section, the pushing mechanism being attached to the translating lines; and
      (iv) one or more guides for guiding the loops formed by the two or more translating lines;
   whereby rotation of the winch drum causes translation of the translating lines in a first direction, further causing the simultaneous wrapping and unwrapping of the translating lines at the winch drum and the translation of the pipe pushing mechanism and insertion of the new pipe section into the pipeline in the first direction.

2. A pipe insertion machine according to claim 1, further comprising torque multiplying components including at least one set of first and second gear sets each set having a torque input and a torque output, the torque input of the first gear set being in rotational communication with an external power source providing a first amount of torque, the torque input of the second gear set being in rotational communication with the torque output of the first gear set, the torque output of the second gear set being in rotational communication with the winch drum, whereby the torque multiplying components transmit multiplied torque from the external rotational power source to the winch drum, causing the winch drum to rotate.

3. A pipe insertion machine according to claim 1, further comprising a pipe elevator mechanism for lowering the new pipe sections into the existing pipeline.

4. A pipe insertion machine according to claim 1, further comprising a clamping device for holding a new pipe section in a steady position.

5. A pipe insertion machine according to claim 4, wherein the clamping device is attached to the support structure at that end near which new pipe sections are being inserted, the clamping device including two arcuate clamping jaws oppositely arranged for circumferentially clamping the new pipe section.

6. A pipe insertion machine according to claim 1, further comprising at least one pressure regulator, at least one load monitor, and at least one load recorder.

7. A pipe insertion machine according to claim 1, wherein the pushing mechanism includes a pushing beam, the pushing head being capable of attachment to the pushing beam to face either the first direction or a second direction, the second direction being opposite the first direction.

8. A pipe insertion machine according to claim 1, wherein:
   (a) the support structure includes first and second ends and a longitudinal axis positioned generally parallel to the existing pipeline;
   (b) the winch includes an axis of rotation oriented generally transverse to the longitudinal axis of the support structure and is in a generally horizontal plane;
   (c) each loop extends from the winch drum to the first end of the support structure, along a path generally parallel to the longitudinal axis of the support structure to the second end of the support structure, and back to the winch; and
   (d) the pushing head of the pushing mechanism is oriented in a plane generally normal to the longitudinal axis of the support structure.

9. A pipe insertion machine according to claim 1, wherein the pushing mechanism includes a pushing beam having the pushing head located on one side and a second pushing head located on an opposite side.

10. A pipe insertion machine for pushing new pipe sections into an existing pipeline having an internal diameter, the pipe insertion machine comprising:
    (a) a support structure; and
    (b) translating components including:
       (i) at least one winch having a winch drum with an axis of rotation, the winch drum rotatably connected to the support structure such that the axis of rotation of the winch drum is transverse to the pipeline;
       (ii) translating cables each having first and second end connected to the winch drum, the translating cables including portions extending along paths generally parallel to the pipe line;
       (iii) a pushing mechanism having a pushing face oriented in a plane normal to the pipeline, the pushing face engagable with an end of the new pipe section, the pushing mechanism being attached to the translating cables;
       (iv) guides for guiding the translating cables, the guides being mounted on the support structure; and
       (v) torque multiplying components connecting an external power source to the winch drum, the torque multiplying components for multiplying the torque produced by the external power source;
    whereby the torque multiplying components transmit external rotational power to the winch, causing the winch drum to rotate; the rotation of the winch drum causing the translation of the translating cables in a first pushing direction and the translation of the pushing mechanism.

11. A pipe insertion machine according to claim 10, wherein the torque multiplying components include at least one set of first and second gear sets each set having a torque input and a torque output, the torque input of the first gear set being in rotational communication with external power source, the torque input of the second gear set being in rotational communication with the torque output of the first gear set, the torque output of the second gear set being in rotational communication with the winch drum.

12. A pipe insertion machine according to claim 10, wherein the pushing mechanism further includes a second pushing face engagable with an end of a new pipe section, the second pushing face oriented in a second direction that is opposite the first direction, whereby reverse translation of the translating cables causes the pushing mechanism to push a new pipe section in the second direction.

13. A pipe insertion machine formed according to claim 10, wherein the pushing face may be oriented in either the first direction or in a second direction oriented opposite the first direction.

14. A pipe insertion machine according to claim 10, wherein rotation of the winch drum causes the simultaneous wrapping and unwrapping of the translating cables at the winch drum and the translation of the pipe pushing mechanism, thereby resulting in the insertion of the new pipe section into the pipeline.

15. A pipe insertion machine formed according to claim 14, wherein the first end of each translating cable is located near an end of the winch drum and the second end of each translating cable is located inward on the winch drum from its respective first end.

16. A method of inserting new pipe sections in an existing pipeline, comprising the steps of:

(a) lowering a new pipe section into a flow conduit in the existing pipeline;

(b) engaging an end of the new pipe section with a pushing mechanism;

(c) translating the pushing mechanism in a first direction to push the new pipe section into the existing pipeline, the pushing mechanism connected to at least two translating lines in rotational communication with a winch; and (d) the step of translating further comprising the step of rotating the winch to translate the at least two translating lines and the pushing mechanism, and to cause the simultaneous wrapping and unwrapping of the at least two translating lines at the winch.

17. The method according to claim 16, further including the steps of:

(a) lowering a second new pipe section into the flow conduit;

(b) engaging an end of the second new pipe section with the pushing mechanism;

(c) translating the pushing mechanism in a second direction to push the new pipe section into the existing pipeline, the second direction being opposite the first direction.

18. The method according to claim 16, wherein the step of translating further includes the step of rotating the winch in the opposite angular direction.

19. The method according to claim 16, wherein the step of translating further includes the steps of:

(a) providing an external power source supplying a first amount of torque; and (b) multiplying the first amount of torque by use of one or more gear sets in rotational communication with the winch in order to provide a second amount of torque, the second amount of torque being larger than the first amount of torque.

20. The method according to claim 16, wherein the step of lowering the new pipe section includes the steps of:

(a) securing one or more straps to the section, the one or more straps being attached to a translating chain in communication with a power source; and (b) activating the power source to cause translation of the chain and the one or more straps holding the section.

* * * * *

UNITED STATES PATENT AND TRADEMARK OFFICE
CERTIFICATE OF CORRECTION

PATENT NO. : 5,662,432
DATED : September 2, 1997
INVENTOR(S) : H.S. Colter

It is certified that error appears in the above-indentified patent and that said Letters Patent is hereby corrected as shown below:

| COLUMN | LINE | |
|---|---|---|
| [57] | Abstract | "damping device(180)" should read --clamping device (180)-- |
| 13 (Claim 1, | 20 line 18) | "the two or more translating lines" should read --the translating lines-- |
| 13 (Claim 1, | 21 line 19) | "winch dram" should read --winch drum-- |
| 14 (Claim 10, | 18 line 7) | "winch dram" should read --winch drum-- |
| 14 (Claim 10, | 21 line 10) | "first and second end" should read --first and second ends-- |
| 14 (Claim 10, | 24 line 13) | "pipe line" should read --pipeline-- |
| 14 (Claim 11, | 46 line 5) | "with external" should read --with an external-- |

Signed and Sealed this

Tenth Day of March, 1998

Attest:

BRUCE LEHMAN

*Attesting Officer*     *Commissioner of Patents and Trademarks*